United States Patent
Hann et al.

(10) Patent No.: US 9,229,471 B2
(45) Date of Patent: Jan. 5, 2016

(54) METHOD AND A DEVICE FOR CONTROLLING A CLOCK SIGNAL GENERATOR

(71) Applicant: TELLABS OY, Espoo (FI)

(72) Inventors: Kenneth Hann, Espoo (FI); Jonas Lundqvist, Espoo (FI)

(73) Assignee: CORIANT OY, Espoo (FI)

( * ) Notice: Subject to any disclaimer, the term of this patent is extended or adjusted under 35 U.S.C. 154(b) by 267 days.

(21) Appl. No.: 13/930,584

(22) Filed: Jun. 28, 2013

(65) Prior Publication Data

US 2014/0006837 A1   Jan. 2, 2014

(30) Foreign Application Priority Data

Jun. 28, 2012   (FI) .................................. 20125742

(51) Int. Cl.
  *G06F 1/12* (2006.01)
  *H04L 12/26* (2006.01)
  *H04J 3/06* (2006.01)

(52) U.S. Cl.
  CPC .............. *G06F 1/12* (2013.01); *H04J 3/0697* (2013.01); *H04L 43/026* (2013.01); *H04J 3/0667* (2013.01)

(58) Field of Classification Search
  CPC ......... H04J 3/0697; G06F 1/12; H04L 43/026
  See application file for complete search history.

(56) References Cited

U.S. PATENT DOCUMENTS

| | | | |
|---|---|---|---|
| 7,289,538 B1 * | 10/2007 | Paradise et al. | 370/497 |
| 7,835,402 B2 | 11/2010 | Erich et al. | |
| 7,983,308 B1 * | 7/2011 | Johnston et al. | 370/514 |
| 2005/0041692 A1 | 2/2005 | Kallstenius | |
| 2005/0207387 A1 | 9/2005 | Middleton et al. | |
| 2009/0190613 A1 | 7/2009 | Finn | |
| 2010/0040369 A1 | 2/2010 | Zhao et al. | |

FOREIGN PATENT DOCUMENTS

| | | | |
|---|---|---|---|
| EP | 1645935 A2 | 4/2006 | |
| JP | 2010206327 A | 9/2010 | |

OTHER PUBLICATIONS

Finnish Search Report, dated Mar. 4, 2013, from corresponding Finnish application.

* cited by examiner

*Primary Examiner* — Albert Wang
(74) *Attorney, Agent, or Firm* — Young & Thompson

(57) ABSTRACT

A device (104) for controlling a clock signal generator includes a processing system configured to form a control quantity at least partly on the basis of reception moments of data frames belonging to a given flow, the reception moments being time values based on a clock signal prevailing at a receiver. The processing system controls the clock signal generator with the control quantity so as to achieve synchronization between the clock signal and another clock signal in accordance of which the data frames have been transmitted. In order to identify data frames belonging to the relevant flow, the processing system checks whether pre-determined bits of a received data frame constitute a bit pattern that occurs when the data frame belongs to the relevant flow. Therefore, the reception moments of data frames belonging to the relevant flow are obtainable without deep inspection of the received data frames.

25 Claims, 3 Drawing Sheets

METHOD AND A DEVICE FOR CONTROLLING A CLOCK SIGNAL GENERATOR

FIELD OF THE INVENTION

The invention relates to a method and a control device for controlling a clock signal generator so as to generate a clock signal that is synchronized with another clock signal. Furthermore, the invention relates to a computer program for controlling a clock signal generator. Furthermore, the invention relates to network element, e.g. a router or a switch, of a data transfer network.

BACKGROUND

Data transfer networks include network elements such as, for example, routers, switches, and terminal devices which communicate with each other via data transfer links between the network elements. In many data transfer networks, there is a need to achieve phase- or at least frequency-synchronization between clock signals prevailing at various network elements. Furthermore, in some data transfer networks, there can be a need to achieve time-synchronization between different network elements in such a way that not only phases and/or frequencies of clock signals but also time values maintained in these network elements are sufficiently close to each other. In other words, each of the network elements should maintain a time value that is common to all network elements under consideration. The common time value is usually called as "wall clock time" or "universal time". In this document, the term "synchronization" means frequency-synchronization, phase-synchronization, time-synchronization, or any combination of them.

Network elements can be configured to constitute master-slave pairs in order to distribute timing information within a data transfer network. For example, a slave network element may be configured to control its clock signal generator so that a reference clock signal prevailing at the corresponding master network element is regenerated in the slave network element at least partly on the basis of reception moments of timing messages transferred from the master network element to the slave network element, where the reception moments are expressed as time values based on the clock signal prevailing at the slave network element. The timing messages can be, for example, time-stamps contained by data frames that can be, for example, Internet Protocol "IP" data packets or Ethernet data frames. Each time-stamp indicates the instantaneous time value at the transmission moment of the respective data frame containing the time-stamp under consideration, where the time value is based on the reference clock signal available at the master network element. For another example, the timing messages can be timing data frames that are transmitted so that the time interval between transmission moments of two successive timing data frames is constant, or otherwise known, when being measured with the reference clock signal available at the master network element. It is also possible that one or more time-stamps indicating the transmission moments of one or more timing messages are transferred in one or more data frames transmitted after the one or more timing messages. In cases where the time-synchronization is needed, the timing information is not only transferred from the master network element to the slave network element but also in the opposite direction from the slave network element to the master network element. A way of achieving the time-synchronization is presented, for example, in the specification 1588 issued by the Institute of Electrical and Electronics Engineers, "IEEE 1588".

In many cases, the reception moment of a data frame carrying or representing a timing message should be stored immediately after the arrival of the data frame at the network element because subsequent processing actions directed to the received data frame may take a stochastic amount of time, and thus storing the reception moment after these processing actions would cause a stochastic component on the stored value of the reception moment. Stochastic components of the kind mentioned above in the stored reception moments destroy or at least weaken the quality of the synchronization. An inherent inconvenience related to storing the reception moments before the above-mentioned processing actions is that, just after reception of a data frame, it is typically difficult to find out whether the received data frame belongs to those data frames whose reception moments needs to be stored. For example, a network element may receive an aggregate flow which consists of several flows of data frames, and only a small portion of the flows may be such flows that the reception moments of data frames belonging to these flows needs to be stored. The flow recognition is typically based on inspection of the received data frames, but there can be a complex encapsulation so that many data transfer protocols are involved in each data frame. This makes it difficult to carry out the inspection within a sufficiently short and deterministic time. A straightforward brute-force solution would be to store the reception moments of all the received data frames together with e.g. copies of at least parts of the data frames and settle later which of the stored reception moments are needed in the synchronization. This straightforward brute-force solution requires, however, a lot of memory and processing capacity.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention there is provided a new method for controlling a clock signal generator. The method comprises:

checking whether pre-determined bits of a received data frame of an aggregate flow constitute a first bit pattern, the first bit pattern occurring when the received data frame belongs to a first flow that is a part of the aggregate flow, in response to a situation in which the first bit pattern occurs, storing the reception moment of the received data frame so that the stored reception moment is associated with the first flow, the reception moment being a time value based on a first clock signal and the received data frame being transmitted in accordance with a second clock signal, forming a control quantity at least partly on the basis of the stored reception moment of the received data frame, and controlling the clock signal generator with the control quantity so as to achieve synchronization between the first clock signal and the second clock signal.

The checking whether the pre-determined bits of the received data frame constitute the first bit pattern can be carried out, for example, using a mask that is compared to the data frame so as to determine whether the data frame belongs to the above-mentioned first flow. The checking whether the pre-determined bits of the received data frame constitute the first bit pattern is a quick operation to be done immediately on the arrival of the data frame. Hence, there is neither a need for inspections that infringe the encapsulation structure of the received data frames nor a need for storing the reception moments of all of the received data frames.

In a method according an exemplifying embodiment of the invention, the clock signal generator generates the first clock signal, and the control of the clock signal generator comprises control of the frequency of the first clock signal. In this case, the first clock signal prevailing at a place of reception of the first flow is a controllable clock signal which is synchronized with the second clock signal prevailing at a place of transmission of the first flow.

In a method according another exemplifying embodiment of the invention, the clock signal generator generates the second clock signal, and thus the control of the clock signal generator comprises control of the frequency of the second clock signal. In this exemplifying method, information based on the reception moment and needed for controlling the clock signal generator is transferred from the place of reception of the first flow to the place of transmission of the first flow. In this case, the second clock signal prevailing at the place of transmission of the first flow is the controllable clock signal which is synchronized with the first clock signal prevailing at the place of reception of the first flow.

In accordance with the second aspect of the invention there is provided a new control device for controlling a clock signal generator. The control device comprises a processing system configured to:
  check whether pre-determined bits of a received data frame of an aggregate flow constitute a first bit pattern, the first bit pattern occurring when the received data frame belongs to a first flow that is a part of the aggregate flow,
  in response to a situation in which the first bit pattern occurs, store the reception moment of the received data frame so that the stored reception moment is associated with the first flow, the reception moment being a time value based on a first clock signal and the received data frame being transmitted in accordance with a second clock signal,
  form a control quantity at least partly on the basis of the stored reception moment of the received data frame, and
  control the clock signal generator with the control quantity so as to achieve synchronization between the first clock signal and the second clock signal.

The control device can be a part of a network element, e.g. a router or a switch, of a data transfer network. It is also possible that the control device is a separate apparatus that is connected to a network element.

In conjunction with a control device according to an exemplifying embodiment of the invention, the clock signal generator generates the first clock signal and the control of the clock signal generator comprises control of the frequency of the first clock signal. In this case, the first clock signal prevailing at the place of reception of the first flow is the controllable clock signal which is synchronized with the second clock signal prevailing at the place of transmission of the first flow.

In conjunction with a control device according to another exemplifying embodiment of the invention, the clock signal generator generates the second clock signal and the control of the clock signal generator comprises control of the frequency of the second clock signal. In this case, the processing system is located in a distributed manner so that a first part of the processing system is located at the place of reception of the first flow and a second part of the processing system is located at the place of transmission of the first flow. The first part of the processing system is configured to check whether the pre-determined bits of a received data frame constitute the first bit pattern and store the reception moment of the received data frame if the first bit pattern occurs. The second part of the processing system is configured to control the clock signal generator on the basis of the control quantity formed either by the first or second part of the processing system. Either the control quantity or information needed for forming the control quantity is transferred from the first part of the processing system to the second part of the processing system.

In accordance with the third aspect of the invention there is provided a new network element that comprises at least one ingress port for connecting to a data transfer network, a controllable clock signal generator for generating a first clock signal, and a processing system configured to:
  check whether pre-determined bits of a received data frame of an aggregate flow constitute a first bit pattern, the first bit pattern occurring when the received data frame belongs to a first flow that is a part of the aggregate flow,
  in response to a situation in which the first bit pattern occurs, store the reception moment of the received data frame so that the stored reception moment is associated with the first flow, the reception moment being a time value based on the first clock signal and the received data frame being transmitted in accordance with a second clock signal,
  form a control quantity at least partly on the basis of the stored reception moment of the received data frame, and
  control the clock signal generator with the control quantity so as to achieve synchronization between the first clock signal and the second clock signal.

In accordance with the fourth aspect of the invention there is provided a new computer program for controlling a clock signal generator. The computer program comprises computer executable instructions for controlling a programmable processor to:
  check whether pre-determined bits of a received data frame of an aggregate flow constitute a first bit pattern, the first bit pattern occurring when the received data frame belongs to a first flow that is a part of the aggregate flow,
  in response to a situation in which the first bit pattern occurs, store the reception moment of the received data frame so that the stored reception moment is associated with the first flow, the reception moment being a time value based on a first clock signal and the received data frame being transmitted in accordance with a second clock signal,
  form a control quantity at least partly on the basis of the stored reception moment of the received data frame, and
  control the clock signal generator with the control quantity so as to achieve synchronization between the first clock signal and the second clock signal.

A computer program product according to the invention comprises a non-volatile computer readable medium, e.g. a compact disc ("CD"), encoded with a computer program according to the invention.

A number of non-limiting exemplifying embodiments of the invention are described in accompanied dependent claims.

Various non-limiting exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in depending claims are mutually freely combinable unless otherwise explicitly stated.

BRIEF DESCRIPTION OF FIGURES

The exemplifying embodiments of the invention and their advantages are explained in greater detail below in the sense of examples and with reference to the accompanying drawings, in which.

DESCRIPTION OF EXEMPLIFYING EMBODIMENTS

Figure 1:
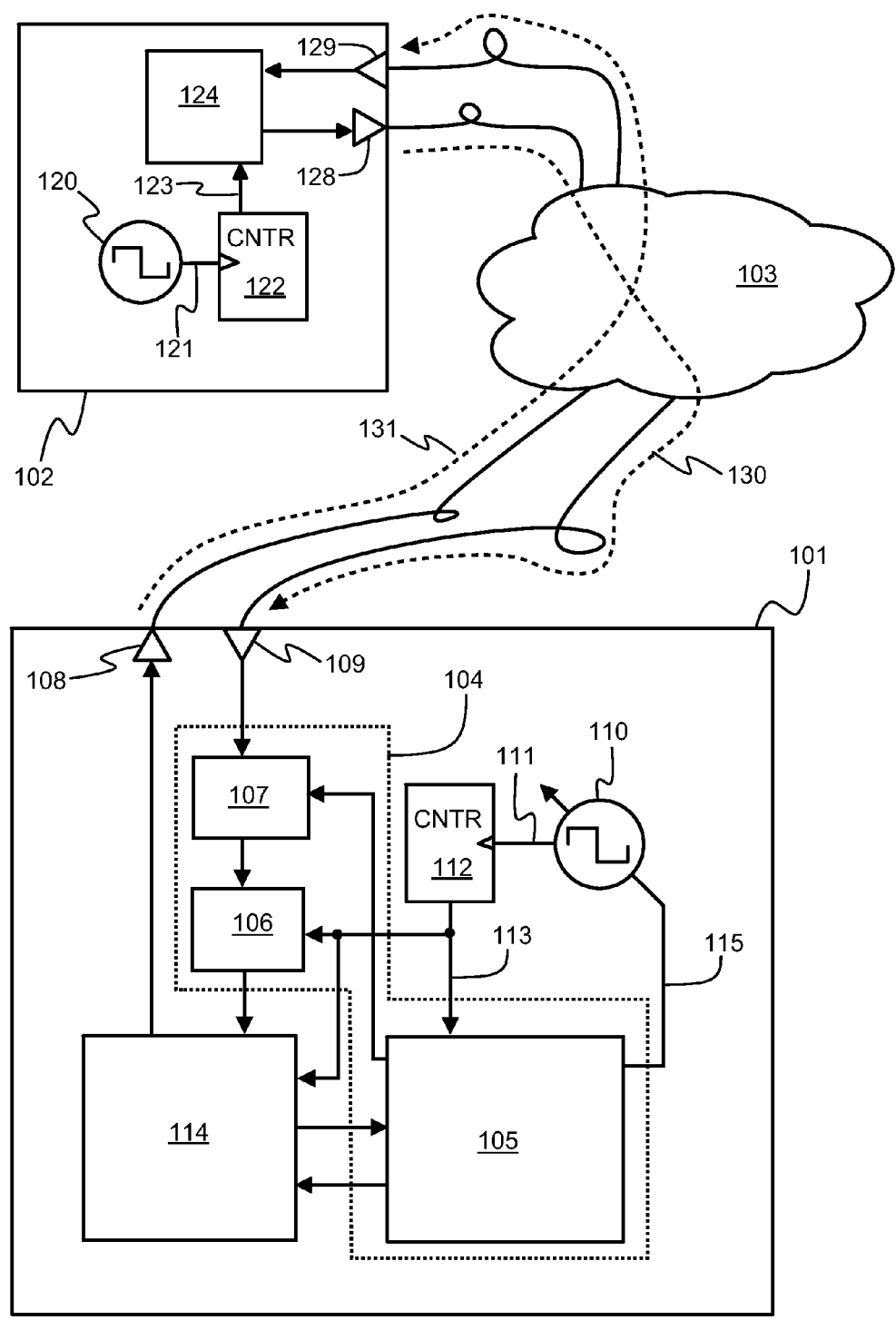
FIG. 1 shows a schematic illustration of an exemplifying data transfer system comprising a network element which is provided with a control device according to an exemplifying embodiment of the invention for controlling a clock signal generator.

FIG. 1 shows a schematic illustration of an exemplifying data transfer system that comprises a network element 101 and a network element 102. The network elements 101 and 102 are connected to each other via a data transfer network 103 that may comprise several other network elements interconnected to each other via data transfer links. Each network element can be, for example but not necessarily, an Internet Protocol ("IP") router, an Ethernet switch, and/or a MultiProtocol Label Switching ("MPLS") switch. The network element 101 comprises a controllable clock signal generator 110 arranged to generate a first clock signal 111. The network element 101 comprises a counter 112 arranged to generate a signal 113 that represents the clock time prevailing at the network element 101.

The network element 101 comprises a processing system 114 for performing control- and forwarding-plane operations related to data transfer protocols being used, e.g. IP, Ethernet, and/or MPLS. Furthermore, the network element 101 comprises at least one ingress port 109 and at least one egress port 108 for connecting to the data transfer network 103. The network element 102 comprises a clock signal generator 120 arranged to generate a second clock signal 121. The network element 102 comprises a counter 122 arranged to generate a signal 123 that represents the clock time prevailing at the network element 102. The network element 102 comprises a processing system 124 for performing control- and forwarding-plane operations related to the data transfer protocols being used. Furthermore, the network element 102 comprises at least one ingress port 129 and at least one egress port 128 for connecting to the data transfer network 103.

In the exemplifying situation shown in FIG. 1, the network element 102 transmits a first flow 130 to the network element 101. The first flow 130 is assumed to comprise data frames which represent timing messages with the aid of which the network element 101 synchronizes the operation of the clock signal generator 110 to the operation of the clock signal generator 120. These data frames of the first flow are transmitted in accordance with the second clock signal 121. The first flow 130 is a part of an aggregate flow constituted by the whole data traffic which is received at the ingress port 109. The network element 101 transmits a second flow 131 to the network element 102. The second flow 131 is a part of the whole data traffic which is received at the ingress port 129.

The network element 101 comprises a control device 104 according to an exemplifying embodiment of the invention for controlling the clock signal generator 110. The control device 104 comprises a processing system configured to implement functional blocks 105, 106 and 107. The functional block 107 is configured to check whether pre-determined bits of a received data frame received at the ingress port 109 constitute a first bit pattern that occurs when the received data frame belongs to the first flow 130. The checking whether the pre-determined bits of the received data frame constitute the first bit pattern can be carried out, for example, using a mask that that is compared to the data frame so as to determine whether the data frame belongs to the first flow. If the first bit pattern occurs, the reception moment of the received data frame is stored so that the stored reception moment is associated with the first flow. In the exemplifying embodiment of the invention illustrated in FIG. 1, the functional block 106 of the processing system is configured to identify overwriteable bits from the received data frame on the basis of stored frame structure information related to the first flow, and overwrite the reception moment of the received data frame to the identified overwriteable bits. Hence, the overwriteable bits are set to carry a reception time-stamp of the received data frame. The overwriteable bits are such bits of the received data frame which can be overwritten without disturbing operation of processes, e.g. control- and forwarding-plane processes, in which data frames belonging to the first flow 130 are involved. The above-mentioned frame structure information expresses the locations of the overwriteable bits within the received data frame.

The functional block 105 of the processing system is configured to form a control quantity 115 at least partly on the basis of stored reception moments of data frames belonging to the first flow 130. The functional block 105 is configured to control the clock signal generator 110 with the control quantity 115 so as to achieve synchronization between the first clock signal 111 and the second clock signal 121.

In a control device according to an exemplifying embodiment of the invention, the functional block 105 of the processing system is configured to form the control quantity 115 according to the formula:

$$C \times [(T2-T1)-(T4-T3)], \quad (1)$$

where T1 is a transmission moment of a data frame of the first flow 130 from the network element 102, T2 is a reception moment of the above-mentioned data frame of the first flow at the network element 101, T3 is a transmission moment of a data frame of the second flow 131 from the network element 101, T4 is a reception moment of the above-mentioned data frame of the second flow at the network element 102, and C is a constant. T1 and T4 can be expressed as time values indicated by the signal 123 that represents the clock time prevailing at the network element 102, and T2 and T3 can be expressed as time values indicated by the signal 113 that represents the clock time prevailing at the network element 101. In this exemplifying embodiment of the invention, the control device 104 can be configured to provide time-synchronization between the network elements 101 and 102 so that the signals 113 and 123 representing the clock times are controlled to be close to each other. The principle is described below.

The time difference T2−T1 in formula (1) includes two components which are the difference of the time values ΔT1 represented by the signals 123 and 113 at the transmission moment of the data frame of the first flow 130 and the transfer delay S1 of this data frame from the network element 102 to the network element 101. Therefore, T2−T1=ΔT1+S1, where the transfer delay S1 is assumed to be indicated as a change of the signal 113. Correspondingly, the time difference T4−T3 in formula (1) includes two components which are the difference of the time values ΔT2 represented by the signals 113 and 123 at the transmission moment of the data frame of the second flow 131 and the transfer delay S2 of this data frame from the network element 101 to the network element 102. Therefore, T4−T3=ΔT2+S2, where the transfer delay S2 is assumed to be indicated as a change of the signal 123. In a case where the transfer delays S1 and S2 are mutually equal and the difference between the signals 113 and 123 does not change during the transfer of the data frame of the first flow 130 and the data frame of the second flow 131, we have S1=S2 and ΔT2=−ΔT1. In this case we get:

$$\Delta T1 = [(T2-T1)-(T4-T3)]/2. \quad (2)$$

Therefore, the difference of the time values represented by the signals 123 and 113 is [(T2−T1)−(T4−T3)]/2. Thus, the result of formula (1) can be used as an input quantity of a regulator configured to control the clock signal generator 110. The regulator can be, for example, a proportional-integrative "PI" regulator, or a proportional-integrative-derivative "PID" regulator.

The time-synchronization presented in the specification 1588 issued by the Institute of Electrical and Electronics Engineers, "IEEE 1588", is based on the above-presented equation (2). It is to be, however, noted that the synchronization related to embodiments of the present invention is not necessarily time-synchronization of clock times prevailing at separate network elements. The synchronization can also be frequency- or phase-synchronization of clock signals, such as the clock signals 111 and 121, prevailing at separate network elements.

In a control device according to an exemplifying embodiment of the invention, the functional block 105 of the processing system is configured to identify, from received data frames, bit patterns each of which being specific to a flow represented by data frames containing the bit pattern. Each identified bit pattern is capable of distinguishing data frames belonging to the corresponding flow from among all data frames of the aggregate flow received at the ingress port 109. The first bit pattern which has been mentioned earlier in this document is the particular one of the identified bit patterns which relates to the first flow 130. The functional block 105 is preferably configured to create, for each identified bit pattern, a mask with the aid of which it is fast and straightforward to determine whether relevant bits of an arbitrary data frame constitute the bit pattern under consideration. Each mask contains '1'-bits and/or '0'-bits and/or 'do not care'-bits. The masks are preferably delivered or otherwise made available to the functional block 107 so as to enable the functional block 107 to classify the received data frames by using the masks.

In a control device according to an exemplifying embodiment of the invention, the functional block 105 of the processing system is configured to identify from received data frames belonging to a given flow, e.g. the first flow 130, such bits which are, in each data frame of this flow, overwriteable without disturbing operation of processes, e.g. control- and forwarding-plane processes, in which the received data frames belonging to the this flow are involved. The functional block 105 is further configured to form, on the basis of the identification, flow-specific frame structure information which expresses the locations of the overwriteable bits within data frames belonging to the flow under consideration. The frame structure information is preferably delivered or otherwise made available to the functional block 106 so as to enable the functional block 106 to identify those bits of a received data frame which can be used for carrying the value of the reception moment, i.e. the reception time-stamp, of the received data frame.

The processing system which comprises the functional blocks 105-107 shown in FIG. 1 can be implemented with one or more programmable processor circuits, one or more dedicated hardware circuits such as an application specific integrated circuit "ASIC", one or more field programmable logic circuits such as a field programmable gate array "FPGA", or a combination of these.

Figure 2:
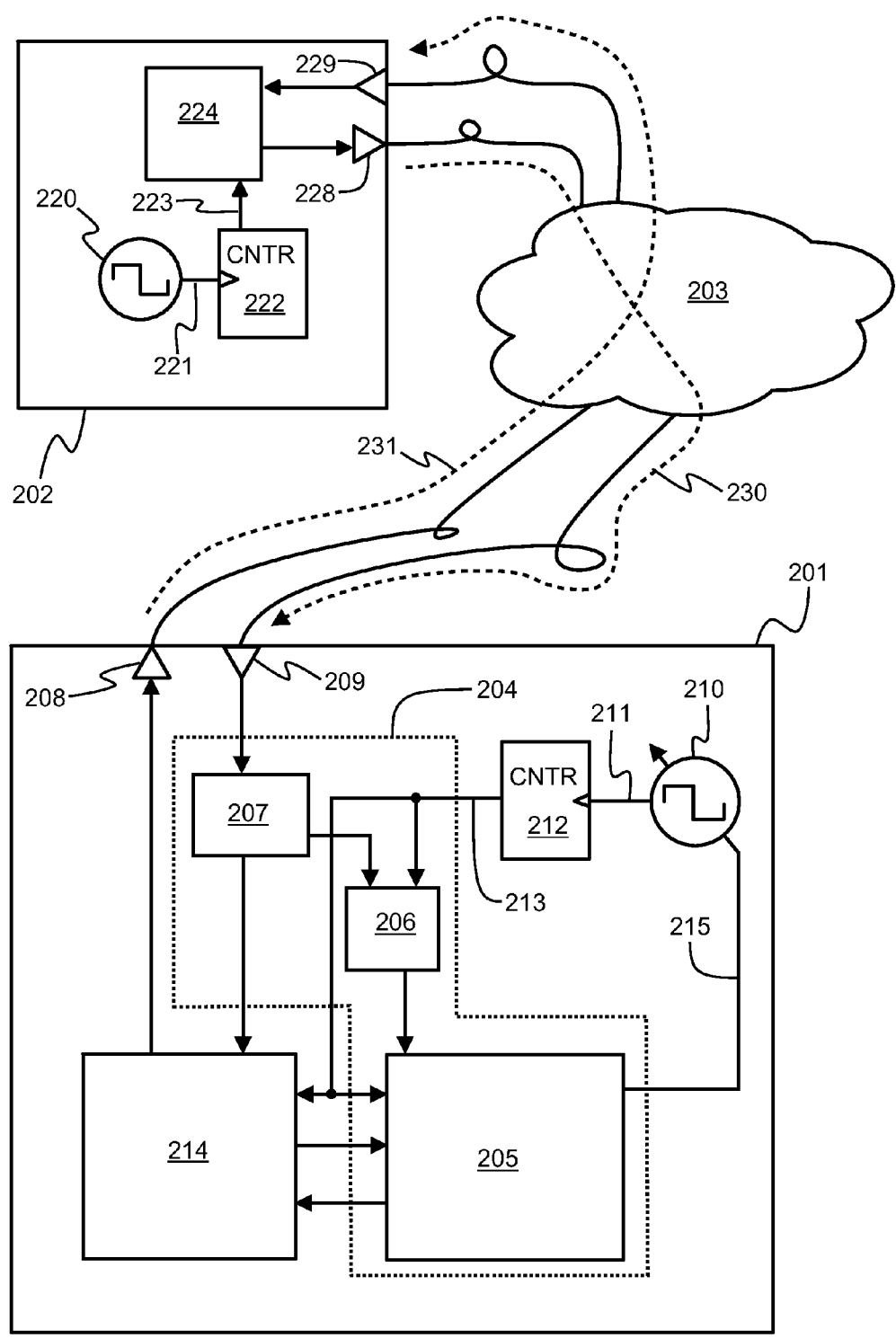
FIG. 2 shows a schematic illustration of an exemplifying data transfer system comprising a network element which is provided with a control device according to an exemplifying embodiment of the invention for controlling a clock signal generator.

FIG. 2 shows a schematic illustration of an exemplifying data transfer system that comprises a network element 201 and a network element 202. The network elements 201 and 202 are connected to each other via a data transfer network 203 that may comprise several other network elements interconnected to each other via data transfer links. The network element 201 comprises a controllable clock signal generator 210 arranged to generate a first clock signal 211. The network element 201 comprises a counter 212 arranged to generate a signal 213 that represents the clock time prevailing at the network element 201. The network element 201 comprises a processing system 214 for performing control- and forwarding-plane operations related to data transfer protocols being used. Furthermore, the network element 201 comprises at least one ingress port 209 and at least one egress port 208 for connecting to the data transfer network 203. The network element 202 comprises a clock signal generator 220 arranged to generate a second clock signal 221. The network element 202 comprises a counter 222 arranged to generate a signal 223 that represents the clock time prevailing at the network element 202. The network element 202 comprises a processing system 224 for performing control- and forwarding-plane operations related to the data transfer protocols being used. Furthermore, the network element 202 comprises at least one ingress port 229 and at least one egress port 228 for connecting to the data transfer network 203.

In the exemplifying situation shown in FIG. 2, the network element 202 transmits a first flow 230 to the network element 201. The first flow 230 is assumed to comprise data frames which represent timing messages with the aid of which the network element 201 synchronizes the operation of the clock signal generator 210 to the operation of the clock signal generator 220. These data frames of the first flow are transmitted in accordance with the second clock signal 221. The first flow 230 is a part of an aggregate flow constituted by the whole data traffic which is received at the ingress port 209. The network element 201 transmits a second flow 231 to the network element 202. The second flow 231 is a part of the whole data traffic which is received at the ingress port 229.

The network element 201 comprises a control device 204 according to an exemplifying embodiment of the invention for controlling the clock signal generator 210. The control device 204 comprises a processing system configured to implement functional blocks 205, 206 and 207. The functional block 207 is configured to check whether pre-determined bits of a received data frame received at the ingress port 209 constitute a first bit pattern that occurs when the received data frame belongs to the first flow 230. If the first bit pattern occurs, the reception moment of the received data frame is stored so that the stored reception moment is logically associated with the first flow. In the exemplifying embodiment of the invention illustrated by FIG. 2, the functional block 206 of the processing system is configured to write the reception moment of the received data frame to a timing data item which is separate with respect to the received data frame and which is logically associated with the first flow. The timing data item is made available to the functional block 205 which is configured to form a control quantity 215 at least partly on the basis of stored reception moments of data frames belonging to the first flow 230. The functional block 205 is further configured to control the clock signal generator 210 with the control quantity 215 so as to achieve synchronization between the first clock signal 211 and the second clock signal 221. Timing data items containing values of reception moments related to successively received data frames of the first flow 230 can be stored in a memory according to the firstin-first-out "fifo" discipline so that the timing data items can be read out by the functional block 205 in the same temporal order in which the corresponding data frames have been received and are processed in the processing system 214. Therefore, in this exemplifying embodiment of the invention, there is formed a by-pass lane via which the values of the reception moments can by-pass the processing system 214. Thus, the values of the reception moments do not need to be written to the respective data frames and, as a corollary, there is no need to identify any overwriteable bits from the data frames.

The logical association between each timing data item indicating the reception moment of a data frame and a flow represented by the said data frame can be implemented in many ways. Few examples are given below.

In a control device according to an exemplifying embodiment of the invention, the functional block 206 is configured to provide each timing data item with a flow identifier which associates the timing data item with the corresponding flow. For example, each timing data item indicating the reception moment of a data frame belonging to the first flow 230 is provided with a flow identifier related to the first flow.

In a control device according to another exemplifying embodiment of the invention, the functional block 206 is configured to write each timing data item into a flow specific memory area that has been allocated for only such timing data items which relate to a same flow. For example, each timing data item indicating the reception moment of a data frame belonging to the first flow 230 is written into a memory area allocated for only such timing data items which relate to the first flow.

The functional block 206 can be further configured to provide each timing data item with a data frame identifier which associates the timing data item with the received data frame. In this case, there is no need to apply fifo or other disciplines when storing the timing data items in order to enable the functional block 205 to know which one of the received data frames corresponds to each timing data item. The data frame identifier may comprise for example: a sequence number of the received data frame, a result of a hash function directed to the received data frame, a copy of at least a part of the received data frame, and/or a copy of at least a part of control data of the received data frame.

It is to be noted that in some embodiments of the invention there is no need to enable the functional block 205 to know which one of the received data frames corresponds to each timing data item. For example, the first flow 230 may consist of data frames that are transmitted from the network element 202 so that the time interval between transmission moments of two successive data frames is constant, or follows a pre-determined temporal pattern, when being measured with the signal 223. In this case, the functional block 205 can be configured to control the clock signal generator 210 so that time interval between reception moments of two successive data frames is constant, or follows the temporal pre-determined pattern, when being measured with the signal 213. In this case, there is no need to know which one of the received data frames corresponds to each timing data item, i.e. which one of the received data frames corresponds to each stored reception moment value.

The processing system which comprises the functional blocks 205-207 shown in FIG. 2 can be implemented with one or more programmable processor circuits, one or more dedicated hardware circuits such as an application specific integrated circuit "ASIC", one or more field programmable logic circuits such as a field programmable gate array "FPGA", or a combination of these.

Figure 3:
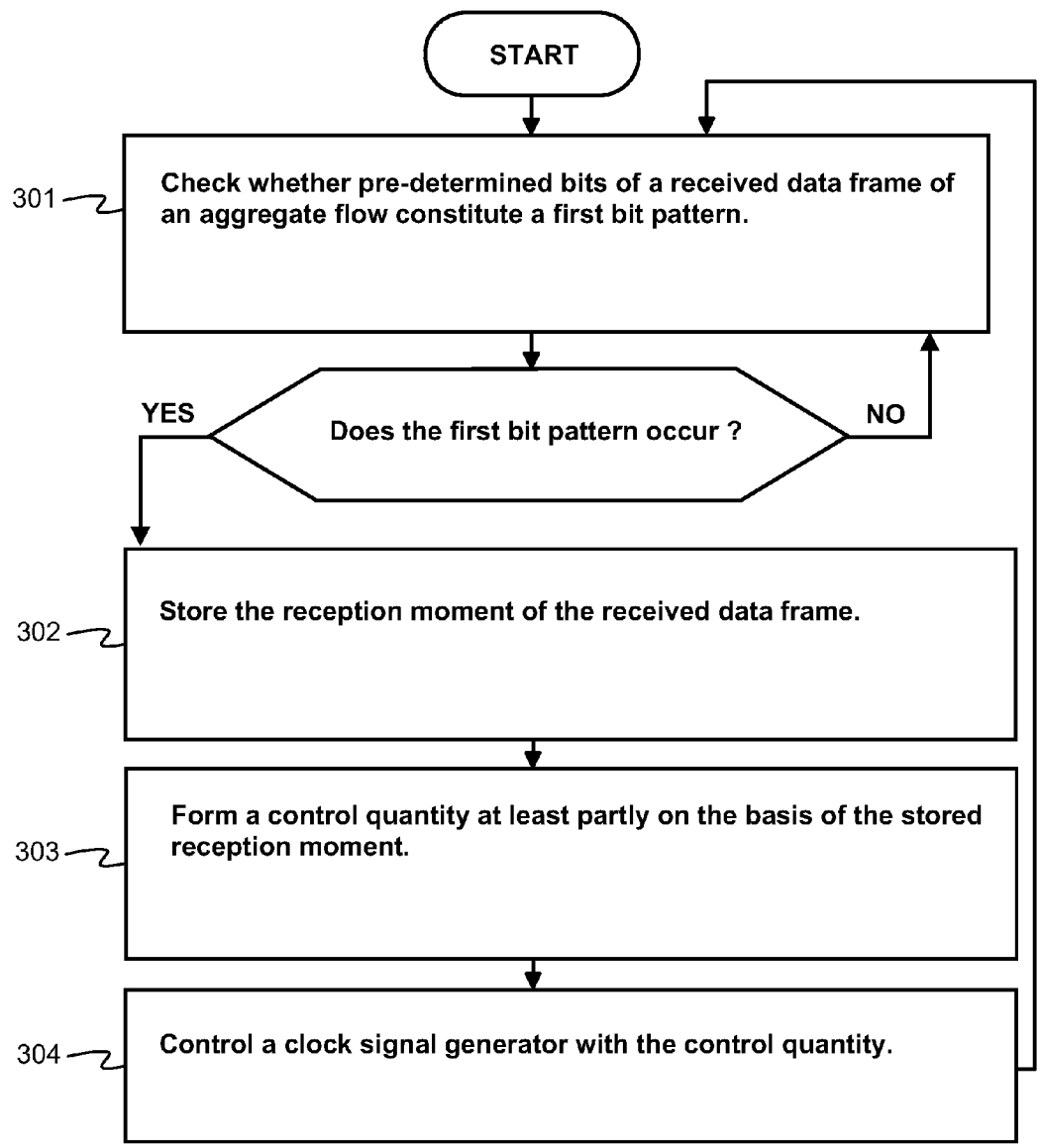
FIG. 3 shows a flow chart of a method according to an exemplifying embodiment of the invention for controlling a clock signal generator.

FIG. 3 shows a flow chart of a method according to an exemplifying embodiment of the invention for controlling a clock signal generator. The method comprises the following actions:
action 301: checking whether pre-determined bits of a received data frame of an aggregate flow constitute a first bit pattern, the first bit pattern occurring when the received data frame belongs to a first flow that is a part of the aggregate flow, and
in response to a situation in which the first bit pattern occurs, the following actions are carried out:
action 302: storing the reception moment of the received data frame so that the stored reception moment is associated with the first flow, the reception moment being a time value based on a first clock signal and the received data frame being transmitted in accordance with a second clock signal,
action 303: forming a control quantity at least partly on the basis of the stored reception moment of the received data frame, and
action 304: controlling the clock signal generator with the control quantity so as to achieve synchronization between the first clock signal and the second clock signal.

In a method according to an exemplifying embodiment of the invention, the clock signal generator generates the first clock signal and the control of the clock signal generator comprises control of a frequency of the first clock signal.

In a method according to an exemplifying embodiment of the invention, the clock signal generator generates the second clock signal, the control of the clock signal generator comprises control of a frequency of the second clock signal, and information based on the reception moments of the data frames belonging to the first flow is transferred from a place of reception of the first flow to a place of transmission of the first flow.

A method according to an exemplifying embodiment of the invention comprises identifying overwriteable bits from the received data frame on the basis of stored frame structure information related to the first flow, and overwriting the reception moment of the received data frame to the identified overwriteable bits of the received data frame.

A method according to another exemplifying embodiment of the invention comprises writing the reception moment of the received data frame to a timing data item which is separate with respect to the received data frame and associated with the first flow. The timing data item can be provided with a flow identifier which associates the timing data item with the first flow, or the timing data item can be stored into a memory area allocated for only such timing data items which relate to the first flow. The timing data item can be provided with a data frame identifier which associates the timing data item with the received data frame. The data frame identifier may comprise for example: a sequence number of the received data frame, a result of a hash function directed to the received data frame, a copy of at least a part of the received data frame, and/or a copy of at least a part of control data of the received data frame.

A method according to an exemplifying embodiment of the invention comprises identifying, from received data frames of the aggregate flow, bit patterns each of which being specific to a flow represented by data frames containing the bit pattern and capable of distinguishing data frames belonging to this flow from among all data frames of the aggregate flow. The above-mentioned first bit pattern is the particular one of the identified bit patterns which relates to the first flow of the aggregate flow.

A method according to an exemplifying embodiment of the invention comprises identifying from the received data frames belonging to the first flow such bits which are, in each data frame of the first flow, overwriteable without disturbing operation of processes in which the received data frames belonging to the first flow are involved. The method according to this exemplifying embodiment of the invention comprises forming, on the basis of the identification, the frame structure information which expresses the locations of the overwriteable bits within each received data frame belonging to the first flow.

A method according to an exemplifying embodiment of the invention comprises forming the control quantity according to the formula:

$$C \times [(T2-T1)-(T4-T3)],$$

where T1 is a transmission moment of the received data frame expressed as a time value based on the second clock signal, T2 is the stored reception moment of the received data frame, T3 is a transmission moment of another data frame expressed as a time value based on the first clock signal, T2 is a reception moment of the other data frame expressed as a time value based on the second clock signal, and C is a constant, the other data frame being transmitted from a place of reception of the first flow and received at a place of transmission of the first flow.

A computer program according to an exemplifying embodiment of the invention comprises software modules for controlling a programmable processor to control a clock signal generator. The software modules comprise computer executable instructions for controlling the programmable processor to:
  check whether pre-determined bits of a received data frame of an aggregate flow constitute a first bit pattern, the first bit pattern occurring when the received data frame belongs to a first flow that is a part of the aggregate flow,
  in response to a situation in which the first bit pattern occurs, store the reception moment of the received data frame so that the stored reception moment is associated with the first flow, the reception moment being a time value based on a first clock signal and the received data frame being transmitted in accordance with a second clock signal,
  form a control quantity at least partly on the basis of the stored reception moment of the received data frame, and
  control the clock signal generator with the control quantity so as to achieve synchronization between the first clock signal and the second clock signal.

The software modules can be, for example, subroutines and functions generated with a suitable programming language.

A computer program product according to an exemplifying embodiment of the invention comprises a non-volatile computer readable medium, e.g. a compact disc ("CD"), encoded with the above-mentioned software modules.

A signal according to an exemplifying embodiment of the invention is encoded to carry information defining a computer program according to an embodiment of the invention.

The specific examples provided in the description given above should not be construed as limiting the applicability and/or the interpretation of the appended claims.

What is claimed is:

1. A control device for controlling a clock signal generator, the control device comprising a processing system configured to:
  form a control quantity at least partly on the basis of stored reception moments of data frames belonging to a first flow that is a part of an aggregate flow, the reception moments being time values based on a first clock signal and the data frames belonging to the first flow being transmitted in accordance with a second clock signal,
  control the clock signal generator with the control quantity so as to achieve synchronization between the first clock signal and the second clock signal,
  check whether pre-determined bits of a received data frame of the aggregate flow constitute a first bit pattern, the first bit pattern occurring when the received data frame belongs to the first flow, and
  in response to a situation in which the first bit pattern occurs, store the reception moment of the received data frame so that the stored reception moment is associated with the first flow.

2. A control device according to claim 1, wherein the processing system is configured to identify overwriteable bits from the received data frame on the basis of stored frame structure information related to the first flow, and to write the reception moment of the received data frame to the identified overwriteable bits of the received data frame.

3. A control device according to claim 1, wherein the processing system is configured to write the reception moment of the received data frame to a timing data item which is separate with respect to the received data frame and associated with the first flow.

4. A control device according to claim 3, wherein the processing system is configured to provide the timing data item with a flow identifier which associates the timing data item with the first flow.

5. A control device according to claim 3, wherein the processing system is configured to write the timing data item into a memory area allocated for only such timing data items which relate to the first flow.

6. A control device according to claim 3, wherein the processing system is configured to provide the timing data item with a data frame identifier which associates the timing data item with the received data frame.

7. A control device according to claim 6, wherein the data frame identifier comprises at least one of the following: a sequence number of the received data frame, a result of a hash function directed to the received data frame, a copy of at least a part of the received data frame, a copy of at least a part of control data of the received data frame.

8. A control device according to claim 1, wherein the processing system is configured to identify, from received data frames of the aggregate flow, bit patterns each of which being specific to a flow represented by data frames containing the bit pattern and capable of distinguishing data frames belonging to this flow from among all data frames of the aggregate flow, the first bit pattern being the one of the identified bit patterns which relates to the first flow of the aggregate flow.

9. A control device according to claim 2, wherein the processing system is configured to identify from received data frames belonging to the first flow such bits which are, in each data frame of the first flow, overwriteable without disturbing operation of processes in which the received data frames belonging to the first flow are involved, and form the frame structure information on the basis of the identification.

10. A control device according to claim 1, wherein the processing system is configured to form the control quantity according to the formula:

$$C \times [(T2-T1)-(T4-T3)],$$

where T1 is a transmission moment of the received data frame expressed as a time value based on the second clock signal, T2 is the stored reception moment of the received data frame, T3 is a transmission moment of another data frame expressed as a time value based on the first clock signal, T2 is a reception moment of the other data frame expressed as a time value based on the second clock signal, and C is a constant, the other data frame being transmitted from a place of reception of the first flow and received at a place of transmission of the first flow.

11. A network element comprising:
at least one ingress port for connecting to a data transfer network,
a controllable clock signal generator for generating a first clock signal, and
a control device for controlling the clock signal generator, wherein the control device comprises a processing system configured to:
form a control quantity at least partly on the basis of stored reception moments of data frames belonging to a first flow that is a part of an aggregate flow, the reception moments being time values based on a first clock signal and the data frames belonging to the first flow being transmitted in accordance with a second clock signal,
control the clock signal generator with the control quantity so as to achieve synchronization between the first clock signal and the second clock signal,
check whether pre-determined bits of a received data frame of the aggregate flow constitute a first bit pattern, the first bit pattern occurring when the received data frame belongs to the first flow, and
in response to a situation in which the first bit pattern occurs, store the reception moment of the received data frame so that the stored reception moment is associated with the first flow.

12. A network element according to claim 11, wherein the network element is at least one of the following: an Internet Protocol IP router, an Ethernet switch, a MultiProtocol Label Switching MPLS switch.

13. A method for controlling a clock signal generator, the method comprising:
forming a control quantity at least partly on the basis of stored reception moments of data frames belonging to a first flow that is a part of an aggregate flow, the reception moments being time values based on a first clock signal and the data frames belonging to a first flow being transmitted in accordance with a second clock signal,
controlling the clock signal generator with the control quantity so as to achieve synchronization between the first clock signal and the second clock signal,
checking whether pre-determined bits of a received data frame of the aggregate flow constitute a first bit pattern, the first bit pattern occurring when the received data frame belongs to the first flow, and
in response to a situation in which the first bit pattern occurs, storing the reception moment of the received data frame so that the stored reception moment is associated with the first flow.

14. A method according to claim 13, wherein the clock signal generator generates the first clock signal and the controlling the clock signal generator comprises controlling a frequency of the first clock signal.

15. A method according to claim 13, wherein the clock signal generator generates the second clock signal, the controlling the clock signal generator comprises controlling a frequency of the second clock signal, and the method further comprises transferring information based on the reception moments of the data frames belonging to the first flow from a place of reception of the first flow to a place of transmission of the first flow.

16. A method according to claim 13, wherein the method comprises identifying overwriteable bits from the received data frame on the basis of stored frame structure information related to the first flow, and writing the reception moment of the received data frame to the identified overwriteable bits of the received data frame.

17. A method according to claim 13, wherein the method comprises writing the reception moment of the received data frame to a timing data item which is separate with respect to the received data frame and associated with the first flow.

18. A method according to claim 17, wherein the method comprises providing the timing data item with a flow identifier which associates the timing data item with the first flow.

19. A method according to claim 17, wherein the method comprises storing the timing data item into a memory area allocated for only such timing data items which relate to the first flow.

20. A method according to claim 17, wherein the method comprises providing the timing data item with a data frame identifier which associates the timing data item with the received data frame.

21. A method according to claim 20, wherein the data frame identifier comprises at least one of the following: a sequence number of the received data frame, a result of a hash function directed to the received data frame, a copy of at least a part of the received data frame, a copy of at least a part of control data of the received data frame.

22. A method according to claim 13, wherein the method comprises identifying, from received data frames of the aggregate flow, bit patterns each of which being specific to a flow represented by data frames containing the bit pattern and capable of distinguishing data frames belonging to this flow from among all data frames of the aggregate flow, the first bit pattern being the one of the identified bit patterns which relates to the first flow of the aggregate flow.

23. A method according to claim 16, wherein the method comprises identifying from the received data frames belonging to the first flow such bits which are, in each data frame of the first flow, overwriteable without disturbing operation of processes in which the received data frames belonging to the first flow are involved, and forming the frame structure information on the basis of the identification.

24. A method according to claim 13, wherein the method comprises forming the control quantity according to the formula:

$$C \times [(T2-T1)-(T4-T3)],$$

where T1 is a transmission moment of the received data frame expressed as a time value based on the second clock signal, T2 is the stored reception moment of the received data frame, T3 is a transmission moment of another data frame expressed as a time value based on the first clock signal, T2 is a reception moment of the other data frame expressed as a time value based on the second clock signal, and C is a constant, the other data frame being transmitted from a place of reception of the first flow and received at a place of transmission of the first flow.

25. A non-transitory computer readable medium encoded with a computer program for controlling a clock signal generator, the computer program comprising computer executable instructions for controlling a programmable processor to:

form a control quantity at least partly on the basis of stored reception moments of data frames belonging to a first flow that is a part of an aggregate flow, the reception moments being expressed as time values based on a first clock signal and the data frames belonging to a first flow being transmitted in accordance with a second clock signal, and control the clock signal generator with the control quantity so as to achieve synchronization between the first clock signal and the second clock signal, check whether pre-determined bits of a received data frame of the aggregate flow constitute a first bit pattern, the first bit pattern occurring when the received data frame belongs to the first flow, and in response to a situation in which the first bit pattern occurs, store the reception moment of the received data frame so that the stored reception moment is associated with the first flow.

* * * * *